US009775323B2

(12) United States Patent
Bahlenberg

(10) Patent No.: US 9,775,323 B2
(45) Date of Patent: Oct. 3, 2017

(54) MILKING ARRANGEMENT, SET OF EXCHANGEABLE EXPENDABLE PARTS AND METHOD FOR A MILKING ARRANGEMENT

(71) Applicant: DELAVAL HOLDING AB, Tumba (SE)

(72) Inventor: Peter Bahlenberg, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 57 days.

(21) Appl. No.: 14/441,908

(22) PCT Filed: Dec. 17, 2013

(86) PCT No.: PCT/SE2013/051526
§ 371 (c)(1),
(2) Date: May 11, 2015

(87) PCT Pub. No.: WO2014/098739
PCT Pub. Date: Jun. 26, 2014

(65) Prior Publication Data
US 2015/0289470 A1 Oct. 15, 2015

Related U.S. Application Data

(60) Provisional application No. 61/739,148, filed on Dec. 19, 2012.

(30) Foreign Application Priority Data

Dec. 19, 2012 (SE) ........................................ 1251454

(51) Int. Cl.
*A01J 5/00* (2006.01)
*A01J 5/007* (2006.01)
(Continued)

(52) U.S. Cl.
CPC ............. *A01J 5/007* (2013.01); *A01J 5/0175* (2013.01); *A01J 5/08* (2013.01); *G06K 7/10366* (2013.01)

(58) Field of Classification Search
CPC .. A01J 5/007; A01J 5/0175; A01J 5/08; A01J 5/00; A01J 5/044; A01J 7/00; G06K 7/10366
(Continued)

(56) References Cited

U.S. PATENT DOCUMENTS 6,427,625 B1 * 8/2002 Schuster ............... A01J 5/0175
119/14.47
6,575,116 B1 * 6/2003 Birk ...................... A01J 5/0175
119/14.48
(Continued)

FOREIGN PATENT DOCUMENTS

SU 816442 A 3/1981
SU 1531931 A1 12/1989
(Continued)

OTHER PUBLICATIONS

International-Type Search Report, dated Jun. 11, 2013, from corresponding PCT application.
(Continued)

*Primary Examiner* — Daniel J Troy
*Assistant Examiner* — Hiwot Tefera
(74) *Attorney, Agent, or Firm* — Young & Thompson

(57) ABSTRACT

An exchangeable expendable part of a milking arrangement includes an identification tag with data by which a model or a manufacturing date of the exchangeable expendable part is uniquely identified. The tag is readable by a reader arranged to repeatedly read the tag and to forward the readings to a computer system, whereby the computer system identifies the model and/or a manufacturing date of the part based on
(Continued)

the readings; and, in response to the identified model and/or manufacturing date, i) alerts an operator, ii) monitors and/or controls the milking arrangement, and/or iii) makes the model and/or the manufacturing date of the part available to an operator. Exchangeable expendable parts include teat cup liners, cartridges including teat cup liners, and milk or vacuum tubes connected to teat cups.

21 Claims, 2 Drawing Sheets

(51) Int. Cl.
    *A01J 5/017* (2006.01)
    *A01J 5/08* (2006.01)
    *G06K 7/10* (2006.01)

(58) Field of Classification Search
    USPC .......... 119/14.08, 14.14, 14.49, 14.01, 14.02
    See application file for complete search history.

(56) References Cited

U.S. PATENT DOCUMENTS

| | | | | |
|---|---|---|---|---|
| 7,980,975 | B2* | 7/2011 | Grossman | F16H 7/023 |
| | | | | 123/198 C |
| 8,543,283 | B2* | 9/2013 | Boss | G06Q 10/20 |
| | | | | 340/568.1 |
| 8,607,734 | B2* | 12/2013 | Auburger | A01J 5/044 |
| | | | | 119/14.18 |
| 2003/0156401 | A1 | 8/2003 | Komine et al. | |
| 2005/0276883 | A1 | 12/2005 | Jeffrey et al. | |
| 2008/0202433 | A1* | 8/2008 | Duke | A01J 5/08 |
| | | | | 119/14.49 |
| 2009/0055293 | A1 | 2/2009 | Mueller | |
| 2010/0087983 | A1* | 4/2010 | Boss | G06Q 10/20 |
| | | | | 701/31.4 |
| 2010/0282173 | A1* | 11/2010 | Petterson | A01J 5/01 |
| | | | | 119/14.02 |
| 2012/0019394 | A1 | 1/2012 | Loi | |
| 2012/0221194 | A1* | 8/2012 | Boss | G06Q 10/20 |
| | | | | 701/32.7 |

FOREIGN PATENT DOCUMENTS

| | | |
|---|---|---|
| WO | 00/04764 A1 | 2/2000 |
| WO | 00/04766 A1 | 2/2000 |
| WO | 00/04768 A1 | 2/2000 |
| WO | 2005/067700 A2 | 7/2005 |
| WO | 2011/064728 A1 | 6/2011 |
| WO | 2013/095290 A1 | 6/2013 |

OTHER PUBLICATIONS

International Search Report, dated Apr. 9, 2014, from corresponding PCT application.
Supplementary International Search Report, dated Jan. 16, 2015, from corresponding PCT application.
S.V. Melnikov, Tekhnologicheskoe oborudovanie zhivotnovodcheskikh ferm I kompleksov, Leningrad, Agropromizdat, Leningradskoe otdelenie, 1985, pp. 504-507.

* cited by examiner

MILKING ARRANGEMENT, SET OF EXCHANGEABLE EXPENDABLE PARTS AND METHOD FOR A MILKING ARRANGEMENT

TECHNICAL FIELD OF THE INVENTION

The present invention relates generally to dairy farming. Particularly, the invention relates to a milking arrangement, a set of exchangeable parts for a milking arrangement, and a method for a milking arrangement.

DESCRIPTION OF RELATED ART AND BACKGROUND OF THE INVENTION

In milking arrangements some parts, such as flexible teat cup liners, milk tubes, and pulsation tubes, may be expendable and thus exchangeable. Teat cup liners, for instance, come in a variety of models to suit the particular species, breed, size, or teat size of the animal to be milked.

The expendable exchangeable parts are typically made of rubber or a polymer. The material of the expendable exchangeable parts deteriorates with the age and operation time and they thus have to be replaced at certain intervals.

The replacement of teat cup liners is complicated and time-consuming and thus costly, and some dairy farmers are thus reluctant to replace the teat cup liners as often as recommended.

WO 2013/095290 discloses a teat cup of a different construction, comprising a connector and a cartridge. The cartridge comprises a sleeve, having a first end and a second end, and a flexible teat cup liner mounted in the sleeve and having an inner space for receiving a teat. A pulsation chamber is formed in the cartridge. The connector is configured to connect a milk conduit to the cartridge. In such a teat cup the whole cartridge is replaced, instead of just the liner as in a conventional teat cup. While this permits the dairy farmer to take advantage of new, improved, molded inflations made of superior materials, it is also assumed that the replacement of such a cartridge is simpler and faster than replacing a conventional teat cup liner.

SUMMARY OF THE INVENTION

However, still the dairy farmer may be hesitant to replace the teat cup liner as often as recommended. Further, the dairy farmer may not manually take actions to ensure that the replacement date is entered into the computer system of the milking arrangement, and thus the dairy farmer will not be reminded of the fact that it is time to replace the teat cup liners even if the computer system would have been equipped with an alarm clock functionality.

Yet further, if the dairy farmer mounts a teat cup liner of a model which is incorrect, this can lead to damages of the milking arrangement, lower milk production, and potentially health problems among the animals. No means exist today that address this issue.

It is therefore an object to provide a milking arrangement, a set of exchangeable parts, and a method, which alleviate the problems discussed above.

It is a further object to provide such a milking arrangement, set, and method, by which the quality and quantity of milk production is optimized, and the animal treatment is improved.

It is yet a further object to provide such a milking arrangement, set, and method, which are efficient, reliable, of reasonable cost, and easy to use.

These objects, among others, are attained by the milking arrangements, the sets of exchangeable parts, and the methods as defined in the appended patent claims.

In a first aspect there is provided a milking arrangement comprising milking equipment provided for milking animals; and a computer system provided for monitoring and/or controlling the milking equipment, wherein the milking equipment comprises a plurality of exchangeable expendable parts in the form of teat cup liners or cartridges including teat cup liners and/or milk or vacuum tubes connected to teat cups of the milking equipment, wherein at least one of said exchangeable expendable parts comprises an identification tag, e.g. an RFID (radio frequency identification) tag, comprising data, by which the model and/or a manufacturing date of said exchangeable expendable part can be uniquely identified; and the milking arrangement further comprises a reader, e.g. an RFID reader, operatively connected to the computer system and arranged to repeatedly read the data of the identification tag of said exchangeable expendable part and to forward the readings of the identification tags of said exchangeable expendable part to the computer system.

The computer system is configured to identify the model and/or a manufacturing date of said exchangeable expendable part based on the readings; and, in response to the identified model and/or manufacturing date, (i) to alert an operator and/or (ii) to monitor and/or control the milking equipment, and/or (iii) to make the model and/or a manufacturing date of said exchangeable expendable part available to an operator.

In a second aspect there is provided a set of exchangeable expendable parts in the form of teat cup liners or cartridges including teat cup liners and/or milk or vacuum tubes connected to teat cups for a milking arrangement comprising milking equipment provided for milking animals; a computer system provided for monitoring and/or controlling the milking equipment; and a reader, e.g. an RFID reader, operatively connected to the computer system and arranged to repeatedly read identification tags, e.g. RFID tags, and to forward the readings to the computer system. At least one of said exchangeable expendable parts comprises an identification tag, e.g. an RFID tag, comprising data, by which the model and/or a manufacturing date of said exchangeable expendable part can be uniquely identified.

In a third aspect there is provided a method for a milking arrangement comprising milking equipment provided for milking animals; and a computer system provided for monitoring and/or controlling the milking equipment, wherein the milking equipment comprises a plurality of exchangeable expendable parts in the form of teat cup liners or cartridges including teat cup liners and/or milk or vacuum tubes connected to teat cups of the milking equipment. The method features the steps of providing at least one of the exchangeable expendable parts with an identification tag, e.g. an RFID tag, comprising data, by which the model and/or a manufacturing date of said exchangeable expendable part can be uniquely identified, repeatedly reading the identification tag of said exchangeable expendable part by a reader, e.g. an RFID reader, operatively connected to the computer system, and forwarding the readings of the identification tag of said exchangeable expendable part to the computer system.

The model and/or a manufacturing date of said exchangeable expendable part is uniquely identified based on the readings; and, in response to the identified model and/or manufacturing date, (i) an operator is alerted, (ii) the milking equipment is monitored and/or controlled, and/or (iii) the model and/or a manufacturing date of said exchangeable expendable part is made available to an operator.

The identification tag may comprise data, such as e.g. a manufacturer serial number and/or a manufacturer batch number by which an individual item, and/or a manufactured group of a certain model, of the exchangeable expendable part can be uniquely identified, and the computer system may be configured to identify the individual item, and/or the manufactured group of a certain model, of the exchangeable expendable part based on the readings.

The above aspects open up a number of possible applications. The computer system may automatically check that exchangeable expendable parts of correct models have been mounted such that the milking arrangement will not be operated with improper equipment, since this would risk causing a lower milk production, failure of the milking arrangement, and/or health problems among the animals. The computer system may additionally, or alternatively, check that the exchangeable expendable parts are not too old or that the operation times for the exchangeable expendable parts are not too long such that the milking arrangement will not be operated with too old or too used exchangeable expendable parts, since this would also risk causing a lower milk production, failure of the milking arrangement, and/or health problems among the animals.

If the identification tag does not in itself comprise the model and/or the manufacturing date of the exchangeable expendable part, the computer system may comprise a database of exchangeable expendable parts, in which the data of the identification tag of the exchangeable expendable part is associated with a model and/or a manufacturing date of the exchangeable expendable part, such that the computer system is capable of retrieving the model and/or the manufacturing date of an exchangeable expendable part after having received a reading of the data of the identification tag of the exchangeable expendable part.

In one embodiment, the computer system may control the milking equipment, in particular milking or vacuum parameters used during milking, in response to the model and/or manufacturing date of at least one exchangeable expendable part. This enables the adaptation of the milking process to the model and/or age of the milking equipment.

In another embodiment, the computer system may (i) store information regarding a desired model of the exchangeable expendable part, (ii) check whether the model of the exchangeable expendable part corresponds to the desired model, and (iii) if the model of the exchangeable expendable part does not correspond to the desired model, control the alerting means to alert an operator of the milking arrangement that the model of the exchangeable expendable part does not correspond to the desired model. Hereby, an automatic system may be realized, which alerts an operator as soon as a critical exchangeable expendable part of a non desired, i.e. incorrect, model has been mounted.

Additionally, or alternatively, if the above condition is obtained, the computer system may stop the milking equipment from being used until the exchangeable expendable part has been exchanged for an exchangeable expendable part which corresponds to the desired model. This may ensure that the milking equipment will never be operated with a critical exchangeable expendable part of a non desired, i.e. incorrect, model. This ensures that the risk for a lower milk production, failure of the milking arrangement, and/or health problems among the animals due to use of a critical exchangeable expendable part of an incorrect model can entirely be avoided.

In yet another embodiment, the computer system may control the robot to change an exchangeable expendable part in response to the model and/or manufacturing date of that exchangeable expendable part. This enables the milking arrangement to automatically change an exchangeable expendable part so as to adapt the model or age of the exchangeable expendable part in order to optimize milking equipment operation. In this way, it is e.g. possible to use different types of teat cup liner for the milking of different animals.

In one version, the computer system may (i) record the operation pattern of the milking equipment, (ii) record the points in time of the received readings, and (iii) repeatedly calculate an operation time, e.g. expressed as number of milkings or hours in operation, for the exchangeable expendable part based on the operation pattern for the milking equipment and the points in time of the received readings. This can be used in a number of embodiments.

In one embodiment, the computer system may control the milking equipment, in particular milking or vacuum parameters used during milking, in response to the repeatedly calculated operation time for the exchangeable expendable part. This enables the adaptation of the milking process to the operation time for the milking equipment, which may in turn enable a longer usage of the equipment before it needs to be exchanged.

In another embodiment, the computer system may comprise alerting means arranged to alert an operator of the milking arrangement in response to the repeatedly calculated operation time for the exchangeable expendable part.

For instance, the computer system may (i) store information regarding a desired operation time for the exchangeable expendable part, (ii) check whether the repeatedly calculated operation time for the exchangeable expendable part exceeds the desired operation time, and (iii) if the repeatedly calculated operation time exceeds the desired operation time, control the alerting means to alert an operator of the milking arrangement that the operation time for the exchangeable expendable part exceeds the desired operation time. Hereby, an automatic system may be realized, which alerts an operator as soon as the operation time for a critical exchangeable expendable part exceeds a desired maximum operation time.

Additionally, if the above condition is obtained, the computer system may stop the milking equipment from being used until the exchangeable expendable part has been exchanged for an exchangeable expendable part having no repeatedly calculated operation time, or at least a repeatedly calculated operation time which is lower than the desired operation time. This may ensure that the milking equipment will never be operated with a critical exchangeable expendable part having too long operation time. This ensures that the risk for a lower milk production, failure of the milking arrangement, and/or health problems among the animals due to use of a too much used critical exchangeable expendable part can entirely be avoided.

In yet another embodiment, the computer system may control the robot to change the exchangeable expendable part in response to the repeatedly calculated operation time for that exchangeable expendable part. This enables the milking arrangement to automatically change the exchangeable expendable part depending on the automatically and repeatedly calculated operation time for said exchangeable expendable part.

It shall be appreciated that the present invention is not only applicable to a single exchangeable expandable part, but can be made applicable to each, or at least one of a plurality, of the exchangeable expendable parts of a milking system.

Yet further, the computer system may store quantities of milk milked by the milking arrangement and/or properties of the animals milked by the milking arrangement and may control (i) the milking equipment, in particular milking or vacuum parameters used during milking, in response to the stored quantities of milk and/or properties of the animals, (ii) the alerting means to alert an operator of the milking arrangement, e.g. by informing the operator that one or more of the exchangeable expendable parts need to be replaced, in response to the stored quantities of milk and/or properties of the animals, or (iii) the robot to change one or more of the exchangeable expendable parts in response to the stored quantities of milk and/or properties of the animals.

For instance, if the quantities of milk milked by the milking arrangement drops, this may be an indication that the exchangeable expendable parts, especially the teat cup liners, used is not the optimum solution and that they should be replaced for some reason, e.g. due to their model number, age, or operation time. The quantities of milk milked by the milking arrangement may be stored, together with the model numbers of the exchangeable expendable parts used, to form a database of historical data. From such data, an optimum choice of models of the exchangeable expendable parts can be selected in order to optimize the milk production and ensure high yields of milk.

Typically, different exchangeable expendable parts may fit different animals. The stored properties of the animals milked by the milking arrangement can be any properties related to the species, breed, age, health, weight, size, shape, teat size, and/or teat shape of the animals. Then, the alerting or the replacement of one or more exchangeable expendable parts may be performed if the properties for an animal or group of animals to be milked differ from the properties for which the one or more exchangeable expendable parts are fitted or adapted. If the milking arrangement is used for milking a large number of animals, these may be grouped and milked together based on the above properties such that the alerting or the replacement of one or more exchangeable expendable parts can be performed between the milking of two different groups of animals.

Further, if the stored properties of the animals milked by the milking arrangement are related to the health of the animals, the alerting or the replacement of one or more exchangeable expendable parts may be performed in response to the stored properties of the animals milked by the milking arrangement indicating that the health of the animals is deteriorated, which could be caused by the use of exchangeable expendable parts of improper models.

The present invention provides means for enabling replacement of exchangeable expendable parts of the milking arrangement including the flexible teat cup liners when recommended, e.g. when they are too old or when they have been used too much, but also when it is detected that incorrect models of the exchangeable expendable parts have been installed. This may be highly important to avoid risks of damaging the milking arrangement and hurting the animals or at least to avoid risks of deteriorated operation of the milking arrangement. Further, guarantees and warranties may only be valid if the milking arrangement is operated correctly, i.e. with exchangeable expendable parts of specified models and having manufacturing dates or hours of operation within specified intervals.

Further characteristics of the invention, and advantages thereof, will be evident from the detailed description of preferred embodiments of the present invention given hereinafter, and the accompanying FIGS. 1-2, which are given by way of illustration only and thus are not limitative of the present invention.

DETAILED DESCRIPTION OF EMBODIMENTS

Figure 1:
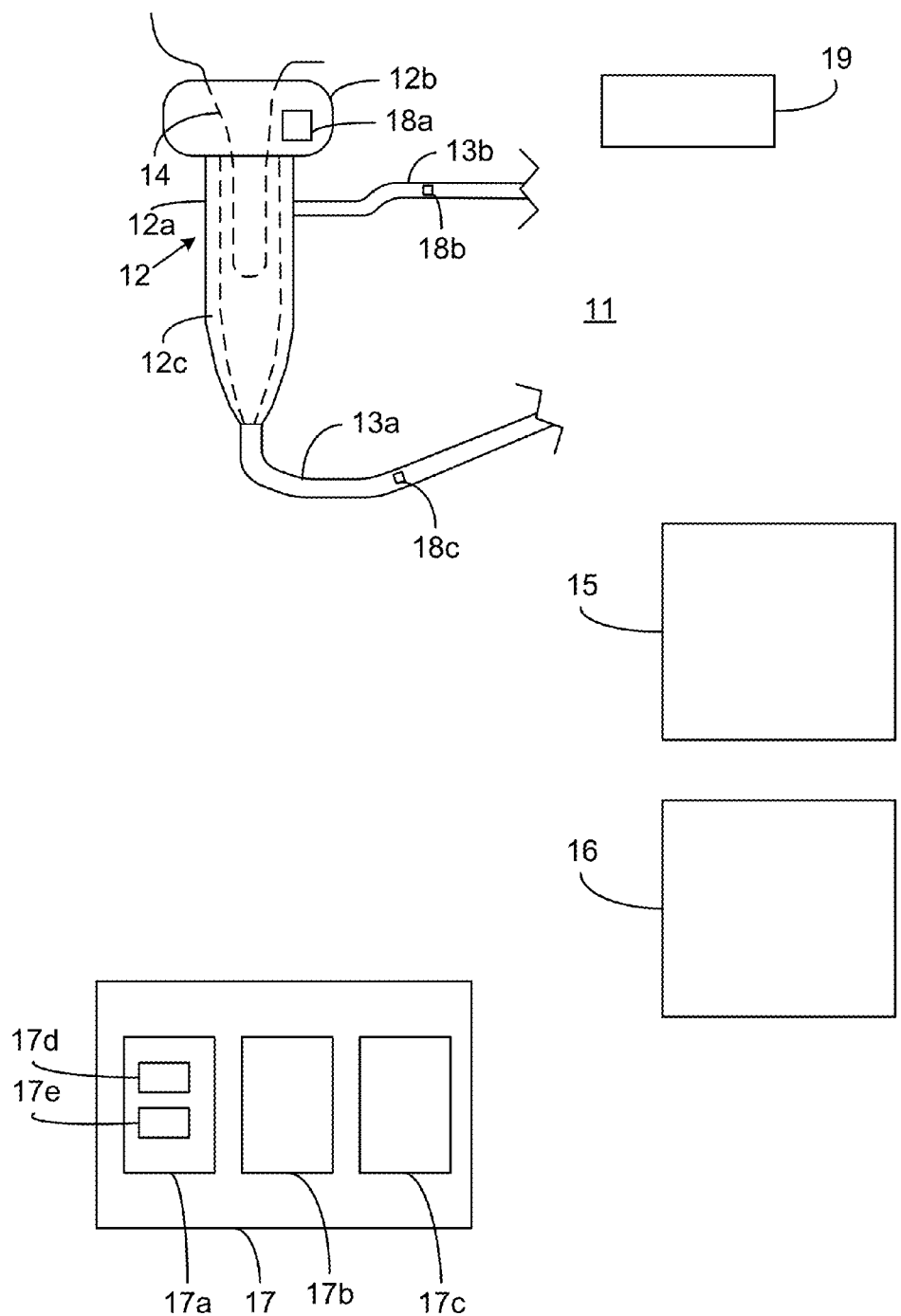
FIG. 1 illustrates schematically main components of a milking arrangement.

A milking arrangement according to an embodiment is partly disclosed in FIG. 1 and comprises milking equipment 11 provided for milking animals, wherein the milking equipment 11 comprises teat cups 12, of which one is illustrated attached to a teat 14 of an animal in FIG. 1. Each teat cup 12 comprises a rigid teat cup shell 12a, a flexible teat cup liner 12b (or cartridge including a flexible teat cup liner), at least one milk tube 13a connecting the interior of the teat cup liner to a milking vacuum, and at least one pulsation vacuum tube 13b connecting the annular space 12c between the teat cup liner 12b and the teat cup shell 12a to a pulsating vacuum. The flexible teat cup liners 12b (or cartridges including flexible teat cup liners), the at least one milk tube 13a, and the at least one pulsation vacuum tube 13b, which are generally made of rubber and/or polymers, or similar, are referred to as exchangeable expendable parts in this text. This means that these parts are being expended and have to be exchanged from time to time, i.a., due to the aging of the materials of the exchangeable expendable parts, which may cause malfunctioning or stopped operation of the milking equipment 11.

An example of the mentioned exchangeable cartridge including a flexible teat cup liner is referred to as a teat cup in WO 2013/095290, the contents of which being hereby incorporated by reference.

The milking equipment 11 may further include a vacuum pump, a pulsator, and valves (not illustrated) for providing the milking vacuum and the pulsating vacuum to the teat cups 12, a receiving vessel (not illustrated) for receiving the milked milk, and a milk meter (not illustrated) for measuring the quantity of the milked milk.

The milking arrangement may further comprise a teat cup magazine 15 for storing the teat cups 12 when they are not attached to the teats 14 of an animal, a robot 16 for attaching the teat cups 12 to the teats 14 of animals to be milked, and a computer system 17 for monitoring and/or controlling the milking equipment ii. The computer system 17 comprises a processor 17a, a memory 17b, and alerting or outputting means 17c in the form of a display for visual alerts or outputs and/or a speaker for audio alerts or outputs. One or more suitable computer programs 17d are stored in the memory 17b and comprise computer program code or instructions that, when executed by the processor 17a, cause the computer system 17 to monitor and/or control the milking equipment 11 as disclosed in this text.

Each of the exchangeable expendable parts disclosed above (the flexible teat cup liners 12b or cartridges including flexible teat cup liners, the milk tube 13a, and the pulsation vacuum tube 13b) is provided with an identification tag 18a-c comprising data, by which the model and/or a manufacturing date of the exchangeable expendable part 12b, 13a-b can be uniquely identified, and the milking arrangement further comprises a reader 19 operatively connected to the computer system 17 and arranged to repeatedly read the identification tag 18a-c of the exchangeable expendable part 12b, 13a-b and to forward the readings of the identification tag 12a -c of the exchangeable expendable part 12b, 13a-b to the computer system 17.

The identification tag 18a-c may be an RFID (radio frequency identification) tag and the reader 19 may be an RFID reader. Alternatively, the identification tag 18a-c may be a visual tag, e.g. a bar code, and the reader 19 may be a visual tag reader, e.g. a bar code reader.

The reader 19 may, at least for the purpose of reading the identification tag 18a of the flexible teat cup liner 12b (or the cartridge including a flexible teat cup liner), be arranged to read the identification tag 18a repeatedly when a teat cup 12 of the milking equipment 11 is arranged in the teat cup magazine 15, is held by the robot 16, or is attached to a teat 14 of an animal. It shall be appreciated that the reader 19 may be located, or movable, suitably in order to read all identification tags 18a-c present at the exchangeable expendable parts 12b, 13a-b. Alternatively, the milking arrangement may comprise more than one reader 19 for the purpose of reading identification tags 18a-c repeatedly and forward the readings to the computer system 17.

The repetition rate for the readings may e.g. be once each time the milking equipment 11 is used for milking, or less frequently such as at least once an hour, twice a day, or once a day. The repeated readings may also take place substantially continuously.

The identification tag 18a-c of an expendable part 12b, 13a-b may comprise item identifying data, such as e.g. a manufacturer serial number, uniquely identifying the individual item of the exchangeable expendable part, batch identifying data, such as e.g. a manufacturer batch number, uniquely identifying a manufactured group of a certain model of the exchangeable expendable part, model identifying data, such as e.g. a manufacturer model number, uniquely identifying the model of the exchangeable expendable part, and/or manufacturing date data uniquely identifying the manufacturing date of the exchangeable expendable part.

The computer system 17 is configured to identify the item, batch, model and/or manufacturing date of the exchangeable expendable part 12b, 13a-b based on the readings.

Alternatively, instead of having the model and/or the manufacturing date of the exchangeable expendable part 12b, 13a-b in the identification tag 18a-c, the computer system 17 may comprise a database 17e of exchangeable expendable parts 12b, 13a-b, in which the identification tag 18a-c of an exchangeable expendable part 12b, 13a-b is associated with a model and/or a manufacturing date of the exchangeable expendable part 12b, 13a-b, such that the computer system 17 is capable of retrieving the model and/or the manufacturing date of an exchangeable expendable part 12b, 13a-b after having received a reading of the data of the identification tag 18a-c of the exchangeable expendable part.

The computer system 17 may be arranged to control the milking equipment 11, in particular milking parameters used during milking, such as e.g. milking vacuum, pulsation vacuum, pulsation rate, and/or pulsation frequency, in response to the item, batch, model, and/or manufacturing date of the exchangeable expendable part 12b, 13a-b.

In particular, the aging of the teat cup liners 12b may cause them to be less elastic or flexible, which may call for different parameter settings. Further, teat cup liners 12b of different manufacturer models may call for different parameter settings.

Alternatively, or additionally, the computer system 17 may control the alerting means 17c to alert an operator of the milking arrangement in response to the item, batch, model, and/or manufacturing date of the exchangeable expendable part 12b, 13a-b.

Yet alternatively, or yet additionally, the computer system 17 may simply store and make the item, batch, model and/or the manufacturing date of the exchangeable expendable part 12b, 13a-b available to an operator of the computer system 17.

In one embodiment, the computer system 17 is arranged to store information regarding a desired model of the exchangeable expendable part 12b, 13a-b in its memory 17b, check whether the model of the exchangeable expendable part 12b, 13a-b corresponds to the desired model, and if the model of the exchangeable expendable part 12b, 13a-b does not correspond to the desired model, control the alerting means 17c to alert an operator of the milking arrangement that the model of the exchangeable expendable part 12b, 13a-b does not correspond to the desired model.

In another embodiment, the computer system 17 is arranged to store information regarding a desired model of the exchangeable expendable part 12b, 13a-b in its memory 17b, check whether the model of the exchangeable expendable part 12b, 13a-b corresponds to the desired model, and if the model of the exchangeable expendable part 12b, 13a-b does not correspond to the desired model, stop the milking equipment 11 from being used until the exchangeable expendable part 12b, 13a-b has been exchanged for an exchangeable expendable part of the desired model.

Further, in one embodiment, the computer system 17 is arranged to control the robot 16 to change an exchangeable expendable part 12b, 13a-b in response to the model and/or manufacturing date of that exchangeable expendable part 12b, 13a-b, e.g. if the model is not correct and/or if the manufacturing date is too old.

The computer system 17 may be arranged to record the operation pattern for the milking equipment 11, record the points in time of the received readings, and repeatedly calculate an operation time, e.g. expressed as number of milkings or hours in operation, for an exchangeable expendable part 12b, 13a-b based on the operation pattern for the milking equipment 11 and the points in time of the received readings. The repeatedly calculated operation time can then be used in any of the following manners.

The computer system 17 may be arranged to control the milking equipment 11, in particular milking parameters such as those exemplified above used during milking, in response to the repeatedly calculated operation time for an exchangeable expendable part 12b, 13a-b. In particular, a long operation time for a teat cup liner 12b may cause it to be less elastic or flexible, which may call for a different parameter setting. If the milking parameters can be adapted in this way, this may enable a longer usage of the exchangeable expendable parts 12b, 13a-b.

Alternatively, or additionally, the computer system 17 may be arranged to control the alerting means 17c to alert an operator of the milking arrangement in response to the repeatedly calculated operation time for an exchangeable expendable part 12b, 13a-b.

In one exemplary embodiment, the computer system 17 may be arranged to store information regarding a desired operation time for an exchangeable expendable part 12b, 13a-b in its memory 17b, check whether the repeatedly calculated operation time for the exchangeable expendable part 12b, 13a-b exceeds the desired operation time, and if the repeatedly calculated operation time exceeds the desired operation time, control the alerting means 17c to alert an operator of the milking arrangement that the operation time for the exchangeable expendable part 12b, 13a-b exceeds the operation time. Hereby, the operator can be alerted that the exchangeable expendable part 12b, 13a-b needs to be replaced.

In another exemplary embodiment, the computer system 17 may be arranged to store information regarding a desired operation time for an exchangeable expendable part 12b, 13a-b in its memory 17b, check whether the repeatedly calculated operation time for the exchangeable expendable part 12b, 13a-b exceeds the desired operation time, and if the repeatedly calculated operation time exceeds the desired operation time, stop the milking equipment from being used until the exchangeable expendable part has been exchanged for an exchangeable expendable part 12b, 13a-b having no repeatedly calculated operation time, or at least a repeatedly calculated operation time which is lower than the desired operation time. Hereby, it can be ensured that the milking equipment is not operated until the exchangeable expendable part 12b, 13a-b that needs to be replaced, indeed has been replaced.

Further, in another embodiment, the computer system 17 may be arranged to control the robot 16 to change an exchangeable expendable part 12b, 13a-b in response to the repeatedly calculated operation time for that exchangeable expendable part. Hereby, the milking arrangement can automatically replace an exchangeable expendable part 12b, 13a-b that needs to be replaced.

In yet another embodiment, the computer system 17 may store quantities of milk milked by the milking arrangement and/or properties of the animals milked by the milking arrangement in its memory 17b, wherein the computer system 17 may be arranged to control the milking equipment 11, in particular milking parameters used during milking, e.g. the ones disclosed above, in response to the stored quantities of milk and/or properties of the animals, the computer system 17 may be arranged to control the alerting means 17c to alert an operator of the milking arrangement, e.g. by informing the operator that an exchangeable expendable part 12b, 13a-b needs to be replaced, in response to the stored quantities of milk and/or properties of the animals, or the computer system 17 may be arranged to control the robot 16 to change an exchangeable expendable part 12b, 13a-b in response to the stored quantities of milk and/or properties of the animals.

The alerting or the replacement of one or more exchangeable expendable parts 12b, 13a-b based on stored quantities of milk milked by the milking arrangement can be implemented in any of the following exemplary embodiments.

If the quantities of milk milked by the milking arrangement drops, this may be an indication that the exchangeable expendable parts 12b, 13a-b, especially the teat cup liners 12b, used is not the optimum solution and that they should be replaced.

Further, the quantities of milk milked by the milking arrangement may be stored, together with the model numbers of the exchangeable expendable parts 12b, 13a-b used, to form a database of historical data. From such data, an optimum choice of models of the exchangeable expendable parts 12b, 13a-b can be selected in order to optimize the milk production and ensure high yields of milk.

If many milking arrangements are connected together, a large database can be formed containing quantities of milk milked together with the model numbers of the exchangeable expendable parts 12b, 13a-b used for different animal herds, which can be used for optimum choices of model numbers of the exchangeable expendable parts 12b, 13a-b. Based on such a database, new recommended uses of exchangeable expendable parts 12b, 13a-b of different models can be made e.g. by the manufacturer.

The alerting or the replacement of exchangeable expendable parts 12b, 13a-b based on stored properties of the animals milked by the milking arrangement can be implemented in any of the following exemplary embodiments.

Typically, different exchangeable expendable parts 12b, 13a-b, at least when relating to teat cup liners 12b, may fit different animals. The stored properties of the animals milked by the milking arrangement can be any properties related to the species, breed, age, health, weight, size, shape, teat size, and/or teat shape of the animals. Then, the alerting or the replacement of exchangeable expendable parts 12b, 13a-b may be performed if the properties for an animal or group of animals to be milked differ from the properties for which said exchangeable expendable parts 12b, 13a-b are fitted or adapted.

If the milking arrangement is used for milking a large number of animals, these may be grouped and milked together based on the above properties such that the alerting or the replacement of exchangeable expendable parts 12b, 13a-b can be performed between the milking of two different groups of animals.

Especially, in milking arrangements wherein the replacement of exchangeable expendable parts is made fast and efficient, the above approaches may be suitable.

Further, if the stored properties of the animals milked by the milking arrangement are related to the health of the animals, the alerting or the replacement of exchangeable expendable parts 12b, 13a-b may be performed in response to the stored properties of the animals milked by the milking arrangement indicating that the health of the animals is deteriorated, which could be caused by use of exchangeable expendable parts 12b, 13a-b of improper models.

In one further aspect the invention relates to a set of exchangeable expendable parts 12b, 13a-b for a milking arrangement as disclosed above, wherein each of the exchangeable expendable parts 12b, 13a-b comprises an identification tag 18a-c as disclosed above.

Figure 2:
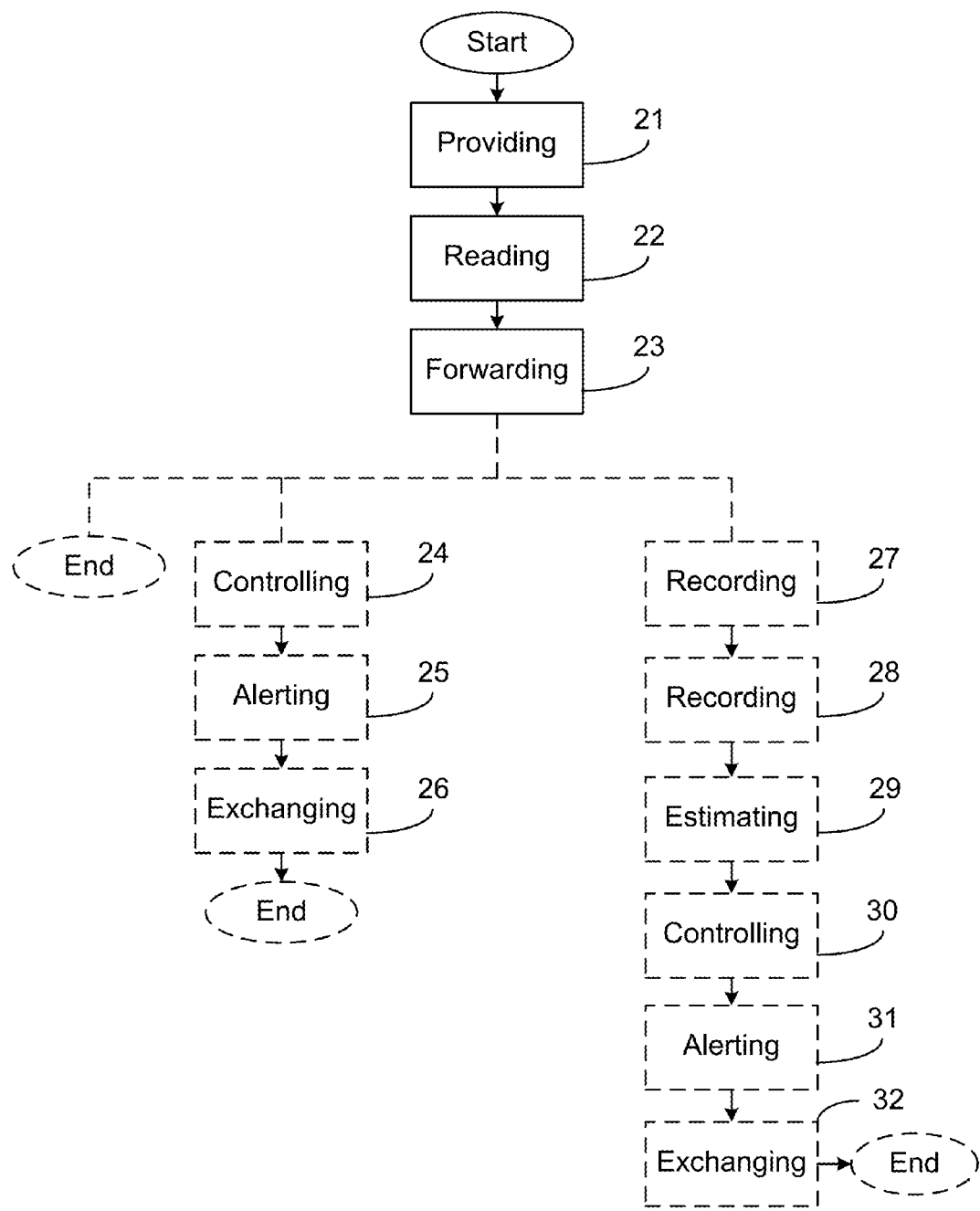
FIG. 2 is a flow scheme of a method for a milking arrangement.

With reference next to FIG. 2, which is a flow scheme of a method for a milking arrangement comprising milking equipment provided for milking animals, and a computer system provided for monitoring and/or controlling the milking equipment, wherein the milking equipment comprises a plurality of exchangeable expendable parts, further aspects of the invention will be disclosed.

According to the method, at least one exchangeable expendable part is, in a step 21, provided with an identification tag, e.g. an RFID (radio frequency identification) tag, comprising data, by which the item, batch, model and/or a manufacturing date of the exchangeable expendable part can be uniquely identified, the identification tag is, in a step 22, repeatedly read by a reader, e.g. an RFID reader, operatively connected to the computer system, and the readings of the identification tag are, in a step 23, forwarded to the computer system, and the item, batch, model, and/or a manufacturing date of the exchangeable expendable part is identified based on the readings.

Various routes may then be taken.

In a first route, three different steps may be performed independently of one another. In one step 24, the milking equipment, in particular milking parameters used during milking such as e.g. those disclosed above, is controlled in response to the item, batch, model, and/or manufacturing date of the exchangeable expendable part. In another step 25, an operator of the milking arrangement is alerted in response to the item, batch, model, and/or manufacturing date of the exchangeable expendable part. In yet another step 26, the exchangeable expendable part is exchanged in response to the item, batch, model, and/or manufacturing date of that exchangeable expendable part.

In a second route, the operation pattern for the milking equipment is, in a step 27, recorded, the points in time of the received readings are, in step 28, recorded, and an operation time, e.g. expressed as number of milkings or hours in operation, for the exchangeable expendable part is, in a step 29, repeatedly calculated based on the operation pattern for the milking equipment and the points in time of the received readings.

Thereafter, three different steps may be performed independently of one another. In one step 30, the milking equipment, in particular milking parameters, such as those disclosed above, used during milking, is controlled in response to any of the repeatedly calculated operation times. In another step 31, an operator of the milking arrangement is alerted in response to any of the repeatedly calculated operation times. In yet another step 32, the exchangeable expendable part is exchanged in response to the repeatedly calculated operation time for that exchangeable expendable part.

In a further route, the uniquely identified item, batch, model, and/or manufacturing date of the exchangeable expendable part is simply stored and made available to an operator at any suitable occasion, such as during a manual check.

It shall be appreciated that above methods and routes may be modified e.g. by incorporating any of the functions performed by the milking arrangement as disclosed with reference to FIG. 1.

In particular, it shall be appreciated that according to one method, information regarding a desired model of an exchangeable expendable part is stored, it is checked whether the model of that exchangeable expendable part (as found in the data of the identification tag or retrieved based on data of the identification tag) corresponds to the desired model, and if the model of the exchangeable expendable part does not correspond to the desired model, an operator of the milking arrangement is alerted of the fact that the model of the exchangeable expendable part does not correspond to the desired model, or the milking equipment is stopped from being used until the exchangeable expendable part has been exchanged for an exchangeable expendable part of the desired model.

According to another method, information regarding a desired operation time for an exchangeable expendable part is stored, it is checked whether the repeatedly calculated operation time for that exchangeable expendable part (obtained as disclosed above) exceeds the desired operation time, and if the repeatedly calculated operation time for the exchangeable expendable part exceeds the desired operation time, an operator of the milking arrangement is alerted of the fact that the operation time for the exchangeable expendable part exceeds the desired operation time, or the milking equipment is stopped from being used until the exchangeable expendable part has been exchanged for an exchangeable expendable part having no repeatedly calculated operation time, or at least a repeatedly calculated operation time which is lower than the desired operation time.

It shall be appreciated that the above methods may be implemented in a large variety of milking arrangements.

The invention claimed is:

1. A milking arrangement, comprising:
   milking equipment (11) that milks animals during a milking process, the milking equipment comprising a teat cup (12) that attaches to a teat (14) of an animal,
   the teat cup (12) comprising a rigid teat cup shell (12a) and an exchangeable expendable teat cup liner connected to the teat cup shell, the exchangeable expendable teat cup liner being one model of a plurality of different models of teat cup liners, each said model of teat cup liner to suit a particular species, breed, size, or teat size of the animal to be milked,
   each exchangeable expendable teat cup liner further comprising an identification tag (18a-c) comprising data that uniquely identifies the respective model of the teat cup liner from the plurality of respective different models of teat cup liners;
   a computer system (17) operatively connected to the milking equipment, with the computer system monitoring or controlling the milking equipment; and
   a reader (19) that reads the data of the identification tag, the reader operatively connected to the computer system and forwarding the read data of the identification tag to the computer system to uniquely identify the model of said exchangeable expendable teat cup liner from the plurality of respective different models,
   wherein, based on said identified model, the computer system adapts of the milking process to the model of the exchangeable expendable teat cup liner by controlling milking parameters of the milking equipment used during milking of the animal in the milking process, including at least one of the group consisting of milking vacuum, pulsation vacuum, pulsation rate, and pulsation frequency.

2. The milking arrangement of claim 1, further comprising:
   an exchangeable expendable part (12b, 13a-b),
   the exchangeable expendable part (12b, 13a-b) including at least one of the group consisting of i) a milk tube (13a) connecting an interior of the teat cup liner to a milking vacuum, and ii) a vacuum tube (13b) connected to the teat cup shell,
   the exchangeable expendable part further comprising a further identification tag (18a-c) comprising data that uniquely identifies at least one of the group consisting of i) a model of said exchangeable expendable part, and ii) a manufacturing date of said exchangeable expendable part,
   wherein the reader (19) further reads the data of the further identification tag, the reader operatively connected to the computer system and forwarding the read data of the of the further identification tag to the computer system,
   wherein, based on said read data of the further identification tag, the computer system identifies i) the model of said exchangeable expendable part or ii) the manufacturing date of said exchangeable expendable part, and in response to the identified model or manufacturing date, i) controls the milking equipment based on the identified model of said exchangeable expendable part, or ii) controls the milking equipment based on the manufacturing date of said exchangeable expendable part.

3. The milking arrangement of claim 2,
   wherein the further identification tag (18a-c) is a radio frequency identification (RFID) tag and the reader (19) is a radio frequency identification (RFID) reader
   wherein the exchangeable expendable part (12b, 13a-b) is one of a set of exchangeable expendable parts (12b, 13a-b) from the group consisting of at least one of i) the milk tube (13a) connecting the interior of the teat cup liner to the milking vacuum, and ii) the vacuum tube (13b) connected to the teat cup shell.

4. The milking arrangement of claim 2,
wherein the further identification tag (18a-c) is a visual tag and the reader (19) is a visual tag reader i) the milk tube (13a) connecting the interior of the teat cup liner to the milking vacuum, and ii) the vacuum tube (13b) connected to the teat cup shell.

5. The milking arrangement of claim 1, wherein,
the identification tag (18a-c) is a radio frequency identification (RFID) tag and the reader (19) is a radio frequency identification (RFID) reader.

6. The milking arrangement of claim 1, wherein,
the identification tag (18a-c) comprises further data that uniquely identifies an individual one of said exchangeable expendable teat cup liner (12b) from other exchangeable expendable teat cup liners (12b) of a same model, and the computer system identifies said individual one exchangeable expendable teat cup liner (12b) based on said further data, the further data being one of the group consisting of i) a serial number of the individual one exchangeable expendable teat cup liner (12b) from plural serial numbers of respective plural ones of the exchangeable expendable teat cup liner (12b) of the same model, ii) a batch identification of one batch from plural batches of the same model of the exchangeable expendable teat cup liner (12b), and iii) a group identification of one group from plural groups of the model of the exchangeable expendable teat cup liner (12b), and
based on said the computer system having identified said individual one exchangeable expendable teat cup liner (12b), the computer system controls the milking equipment including milking parameters or vacuum parameters used during milking.

7. The milking arrangement of claim 1, wherein,
wherein the identification tag (18a-c) is a visual tag and the reader (19) is a visual tag reader.

8. The milking arrangement of claim 2, wherein,
the computer system (17) comprises a database (17e) of a plurality of said exchangeable expendable part (12b, 13a-b), said database including said data associated with the manufacturing date of said exchangeable expendable part, and
the computer system retrieves the manufacturing date of the exchangeable expendable part from the database after having received the read data of the further identification tag of the exchangeable expendable part,
wherein the computer system (17), in response to the identified manufacturing date of said exchangeable expendable part and when the identified manufacturing date is found to be earlier than an acceptable date for use in milking the animal, adapts milking parameters of the milking equipment during milking of the animal.

9. The milking arrangement of claim 2, wherein the computer system (17) further comprises an alerting unit (17c) that alerts an operator of the milking arrangement in response to the manufacturing date of said exchangeable expendable part or of said exchangeable expendable teat cup liner, when the manufacturing date is found to be earlier than an acceptable date for use in milking the animal.

10. The milking arrangement of claim 9, wherein,
the data of the further identification tag (18a-c) uniquely identifies the model of said exchangeable expendable part by the computer system retrieving the model of the exchangeable expendable part from a plurality of models of exchangeable expendable part stored in the database (17e), and
the computer system (17) i) stores information regarding model of said exchangeable expendable part (12b, 13a-b) for milking the animal, ii) checks whether the model of said exchangeable expendable part corresponds to said desired model, and iii) controls the alerting unit (17c) to alert the operator that the model of said exchangeable expendable part does not correspond to said desired model.

11. The milking arrangement of claim 2, further comprising a robot (16) operatively connected to the computer system, wherein the computer system (17) controls said robot to change the exchangeable expendable part (12b, 13a-b) in response to the identified model of the exchangeable expendable part.

12. The milking arrangement of claim 2, wherein,
the data of the further identification tag (18a-c) uniquely identifies the model of said exchangeable expendable part by the computer system using the data to retrieve the model of the exchangeable expendable part from a plurality of models of exchangeable expendable part stored in the database (17e), and
the computer system (17) i) stores information regarding a desired model of said exchangeable expendable part (12b, 13a-b) for milking the animal, ii) checks whether the model of said exchangeable expendable part corresponds to said desired model, and iii) when the model of said exchangeable expendable part does not correspond to said desired model, stops the milking equipment from being used until the model of said exchangeable expendable part has been exchanged for one of the exchangeable expendable part of said desired model.

13. The milking arrangement of claim 2, wherein,
based on the read data of said exchangeable expendable part received from the reader, the computer system uniquely identifies both i) the model of said exchangeable expendable part and ii) the manufacturing date of said exchangeable expendable part,
the computer system (17) i) stores information regarding a desired model of said exchangeable expendable part (12b, 13a-b) for milking the animal, ii) checks whether the identified model of said exchangeable expendable part corresponds to said desired model, and iii) when the model of said exchangeable expendable part does not correspond to said desired model, controls the alerting unit (17c) to alert the operator that the model of said exchangeable expendable part does not correspond to said desired model, and
the computer system determines whether the identified manufacturing date is earlier than an acceptable date for use in milking the animal, and when computer system determines that the identified manufacturing date is earlier than the acceptable date for use in milking the animal, the computer system adapts milking parameters of the milking equipment during milking of the animal based on the age of the exchangeable expendable part and alerts an operator of the milking arrangement that the identified manufacturing date is earlier than the acceptable date for use in milking the animal.

14. The milking arrangement of claim 2,
wherein the computer system (17) i) records an operation pattern for the milking equipment (11), ii) records points in time of the received read data, and iii) repeatedly calculates an operation time of said exchangeable expendable part (12b, 13a-b) based on the operation pattern for the milking equipment and the points in time of the received readings, and wherein the computer system (17) further i) stores information regarding a desired operation time for said exchangeable expendable part (12b, 13a-b), ii) checks whether the repeatedly calculated operation time for said exchangeable expendable part exceeds said desired operation time, and iii) when said repeatedly calculated operation time exceeds said desired operation time, operates an alerting unit (17c) to alert an operator that the operation time for said exchangeable expendable part exceeds the desired operation time.

15. The milking arrangement of claim 2, wherein the computer system (17) i) records an operation pattern for the milking equipment (11), ii) records points in time of the received read data, and iii) repeatedly calculates an operation time of said exchangeable expendable part (12b, 13a-b) based on the operation pattern for the milking equipment and the points in time of the received readings, and wherein the computer system (17) further i) stores information regarding a desired operation time for said exchangeable expendable part (12b, 13a-b), ii) checks whether the repeatedly calculated operation time for said exchangeable expendable part exceeds said desired operation time, and iii) when said repeatedly calculated operation time exceeds said desired operation time, stops the milking equipment from being used until said exchangeable expendable part has been exchanged for one of the exchangeable expendable part having no repeatedly calculated operation time, or one of the exchangeable expendable part having at least a repeatedly calculated operation time which is lower than the desired operation time.

16. The milking arrangement of claim 2, wherein the computer system (17) i) records an operation pattern for the milking equipment (11), ii) records points in time of the received read data, and iii) repeatedly calculates an operation time of said exchangeable expendable part (12b, 13a-b) based on the operation pattern for the milking equipment and the points in time of the received readings, and further comprising a robot (16) operatively connected to the computer system, wherein the computer system controls said robot to change the exchangeable expendable part (12b, 13a-b) in response to the repeatedly calculated operation time for the exchangeable expendable part.

17. The milking arrangement of claim 2, wherein, the computer system (17) stores quantities of milk milked by the milking arrangement or properties of the animals milked by the milking arrangement, and the computer system operates to i) control the milking equipment (11), including milking parameters used during milking, in response to said stored quantities of milk or properties of the animals, ii) operate an alerting unit (17c) that alerts an operator of the milking arrangement in response to said stored quantities of milk or properties of the animals, or iii) control a robot to change said exchangeable expendable part in response to said stored quantities of milk or said stored properties of the animals milked by the milking arrangement.

18. A method for operating a milking arrangement during a milking process, comprising:

providing a teat cup (12) of milking equipment (11) of the milking arrangement with an exchangeable expendable part (12b, 13a-b), the teat cup (12) comprising a rigid teat cup shell (12a) and the exchangeable expendable part (12b, 13a-b), the exchangeable expendable part (12b, 13a-b) including at least one of the group consisting of i) a teat cup liner connected to the teat cup shell, ii) a cartridge including a teat cup liner (12b) connected to the teat cup shell, iii) a milk tube (13a) connecting an interior of the teat cup liner to a milking vacuum, and iv) a vacuum tube (13b) connected to the teat cup shell, the exchangeable expendable part further comprising an identification tag (18a-c) comprising data that uniquely identifies at least one of the group consisting of i) a model of said exchangeable expendable part, and ii) a manufacturing date of said exchangeable expendable part, wherein the milking equipment further comprising a computer system (17) operatively connected to monitor or control the milking equipment; and a reader (19) that reads the data of the identification tag, the reader operatively connected to the computer system to forward the read data of the identification tag to the computer system;

the reader (19) reading (22) the data of the identification tag of said exchangeable expendable part;

the reader (19) forwarding (23) the read data of the identification tag of said exchangeable expendable part to the computer system;

based on the read data of said exchangeable expendable part received from the reader, the computer system uniquely identifying at least one of the group consisting of i) the model of said exchangeable expendable part by the computer system retrieving the model of the exchangeable expendable part from a plurality of models of the exchangeable expendable part stored in a database (17e) of the computer, and ii) the manufacturing date of said exchangeable expendable part; and the computer system adapting the milking process to the identified model and age of the exchangeable expendable parts by i) during milking of the animal in the milking process, controlling milking parameters of the milking equipment including at least one of the group consisting of milking vacuum, pulsation vacuum, pulsation rate, and pulsation frequency based on the identified model of each exchangeable expendable part, or ii) during the milking of the animal in the milking process, controlling the milking parameters of the milking equipment including at least one of the group consisting of milking vacuum, pulsation vacuum, pulsation rate, and pulsation frequency based on the identified manufacturing date of each exchangeable expendable part.

19. The method of claim 18, wherein, the identification tag (18a-c) is a radio frequency identification (RFID) tag and the reader (19) is a radio frequency identification (RFID) reader, and the radio frequency identification (RFID) tag comprises further data that uniquely identifies the individual exchangeable expendable part from other exchangeable expendable parts of a same model, and comprising the further step of the computer system identifying said individual exchangeable expendable part based on said further data, the further data being one of the group consisting of i) a serial number of an individual one exchangeable expendable part from plural serial numbers of respective plural ones of the exchangeable expendable part of the same model, ii) a batch identification of one batch from plural batches of the same model, and iii) a group identification of one group from plural groups of the same model.

20. The method of claim 18, comprising the further steps of:
  the computer system recording i) an operation pattern for the milking equipment (11), and ii) points in time of the computer system receiving the read data of said exchangeable expendable part, and
  the computer system repeatedly calculating (29), based on the recorded operation pattern for the milking equipment and the recorded points in time of the received read data, an operation time of said exchangeable expendable part (12*b*, 13*a-b*);
  based on the repeatedly calculated operation time, the computer system i) controlling the milking equipment, including milking parameters used during milking of the animal, ii) alerting an operator of the milking arrangement concerning the operation time of said exchangeable expendable part, and iii) exchanging said exchangeable expendable part for another of said exchangeable expendable part.

21. The method of claim 18, comprising the further steps of:
  based on the read data of said exchangeable expendable part received from the reader, the computer system uniquely identifies both i) the model of said exchangeable expendable part and ii) the manufacturing date of said exchangeable expendable part,
  the computer system (17) i) stores information regarding a desired model of said exchangeable expendable part (12*b*, 13*a-b*) for milking the animal, ii) checks whether the identified model of said exchangeable expendable part corresponds to said desired model, and iii) when the model of said exchangeable expendable part does not correspond to said desired model, controls the alerting unit (17*c*) to alert the operator that the model of said exchangeable expendable part does not correspond to said desired model, and
  the computer system determines whether the identified manufacturing date is earlier than an acceptable date, and based on the computer system determining that the identified manufacturing date is earlier than the acceptable date, the computer system controls milking parameters of the milking equipment during milking of the animal and alerts an operator of the milking arrangement that the identified manufacturing date is earlier than the acceptable date.

* * * * *